United States Patent
Kwon et al.

(10) Patent No.: US 8,934,729 B2
(45) Date of Patent: Jan. 13, 2015

(54) METHOD AND APPARATUS FOR FRAME CODING IN VERTICAL RASTER SCAN ORDER FOR HEVC

(75) Inventors: Do-Kyoung Kwon, Allen, TX (US); Hyung Joon Kim, McKinney, TX (US); Madhukar Budagavi, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 462 days.

(21) Appl. No.: 13/250,806

(22) Filed: Sep. 30, 2011

(65) Prior Publication Data

US 2012/0082392 A1    Apr. 5, 2012

Related U.S. Application Data

(60) Provisional application No. 61/388,478, filed on Sep. 30, 2010, provisional application No. 61/474,435, filed on Apr. 12, 2011.

(51) Int. Cl.
| | | |
|---|---|---|
| *G06K 9/36* | (2006.01) | |
| *H04N 19/137* | (2014.01) | |
| *H04N 5/232* | (2006.01) | |
| *H04N 19/102* | (2014.01) | |
| *H04N 19/176* | (2014.01) | |
| *H04N 19/61* | (2014.01) | |
| *H04N 19/46* | (2014.01) | |

(52) U.S. Cl.
CPC ..... *H04N 19/00145* (2013.01); *H04N 5/23258* (2013.01); *H04N 19/00012* (2013.01); *H04N 19/00278* (2013.01); *H04N 19/00781* (2013.01); *H04N 19/00545* (2013.01)
USPC .......................................... 382/233

(58) Field of Classification Search
USPC .................. 382/232, 233, 235-236; 375/240, 375/240.16; 348/385.1
See application file for complete search history.

(56) References Cited

U.S. PATENT DOCUMENTS

2006/0209206 A1* 9/2006 Wang et al. ................ 348/385.1
2010/0254617 A1* 10/2010 Hwang et al. ................ 382/232

OTHER PUBLICATIONS

Minhua Zhou "Sub-Picture Based Raster Scan Coding Order for HEVC UHD Video Coding," JCTVC-B062, Jul. 21-28, 2010, Geneva, Switzerland.
Do-Kyoung Kwon, et al. "Frame Coding in Vertical Raster Scan Order," JCTVC-C224, Oct. 7, 2010, Guangzhou, China.

* cited by examiner

*Primary Examiner* — Duy M Dang
(74) *Attorney, Agent, or Firm* — Mirna Abyad; Frederick J. Telecky, Jr.

(57) ABSTRACT

A method and apparatus for frame coding in adaptive raster scan order. The method includes encoding at least one of image or video utilizing input frames and at least one of a data related to the input frame to produce bitstream with raster scan order information and displacement information for producing compressed video bitstream, at decoding time, decoding at least one of the encoded bitstream with raster scan order information and displacement information for producing compressed video bitstream.

6 Claims, 4 Drawing Sheets

METHOD AND APPARATUS FOR FRAME CODING IN VERTICAL RASTER SCAN ORDER FOR HEVC

CROSS-REFERENCE TO RELATED APPLICATIONS

This application claims benefit of U.S. provisional patent application Ser. No. 61/388,478 and 61/474,435, filed Sep. 30, 2006 and Apr. 12, 2011, respectively, which are herein incorporated by reference.

BACKGROUND OF THE INVENTION

1. Field of the Invention

Embodiments of the present invention generally relate to a method and apparatus for frame coding in vertical raster scan for HEVC.

2. Description of the Related Art

HEVC is a video coding standard being standardized to improve coding efficiency by 50% over H264/AVC. To achieve this goal, lots of new coding tools have been proposed for HEVC. However, all the proposed coding tools assume the horizontal raster scan of micro blocks, which has two problems: 1) Horizontal raster scan is not always effective in prediction especially for intra coding and 2) with sliding window memory for motion estimation (ME) and motion compensation (MC), large on-chip memory is required to compensate for large vertical motion. This is especially a challenging for UHD (ultra high definition) videos, such as, 4 k×2 k and 8 k×4 k. While UHD video coding is one of the application areas of HEVC, the frame coding in horizontal scan order is not cost effective at all for UHD videos with high vertical motion.

Therefore, there is a need for a method and/or apparatus for frame coding for HEVC.

SUMMARY OF THE INVENTION

Embodiments of the present invention relate to a method and apparatus for frame coding in adaptive raster scan order. The method includes encoding at least one of image or video utilizing input frames and at least one of a data related to the input frame to produce bitstream with raster scan order information and displacement information for producing compressed video bitstream, at decoding time, decoding at least one of the encoded bitstream with raster scan order information and displacement information for producing compressed video bitstream.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

The proposed method and apparatus add a vertical raster scan order to the HEVC standard and adaptively select the best coding scan order between the horizontal and vertical raster scan orders based on any criteria, such as, size of horizontal/vertical motion, coding efficiency, on-chip memory saving and etc.

Figure 1:
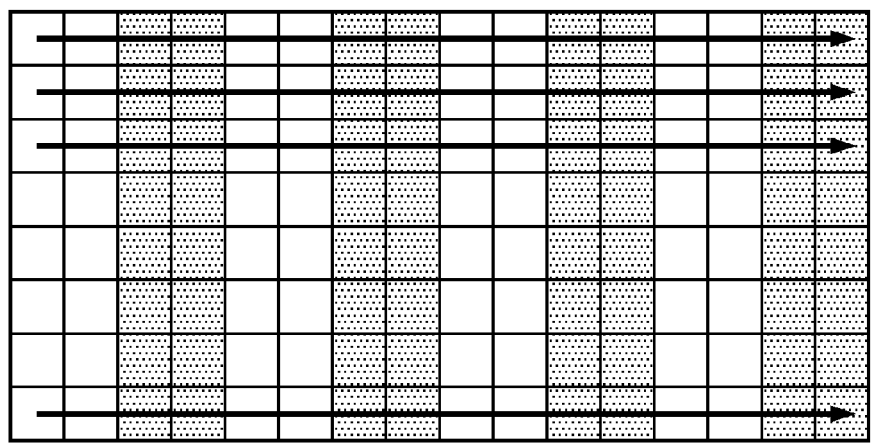
FIG. 1 is an embodiment of a frame coding in horizontal raster scan order.
Figure 2:
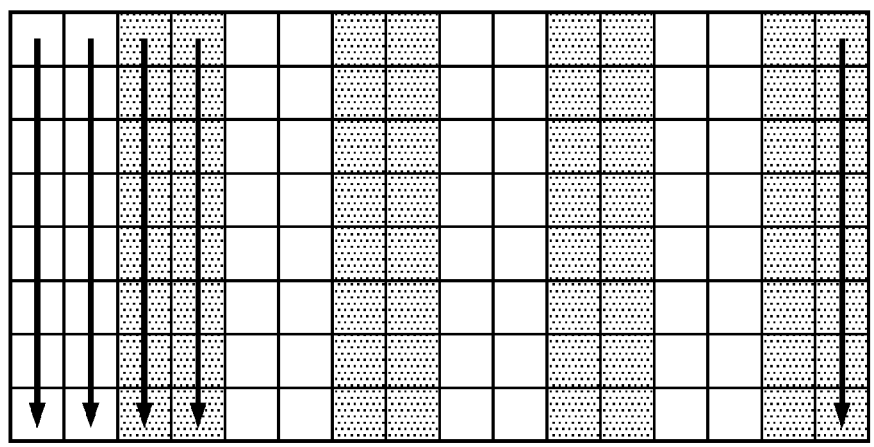
FIG. 2 is an embodiment of a frame coding in vertical raster scan order.

The vertical raster scan is effective for the frames which have lots of vertical discontinuities. FIG. 1 is an embodiment of a frame coding in horizontal raster scan order. FIG. 2 is an embodiment of a frame coding in vertical raster scan order. In FIG. 1 and FIG. 2, the frame with vertical discontinuities with horizontal and vertical raster scan orders are shown, respectively. When we apply the horizontal raster scan order, as shown in FIG. 1, more bits are used to encode micro block mode. This is due to incorrect mode prediction caused by discontinuity. However, the number of bits is reduced when we apply the vertical raster scan order, as shown in FIG. 2. Hence, the coding gain will be more significant for intra frames. The result indicates that the vertical raster scan can reduce bitrates up to 4% for some sequences, even without adaptive horizontal/vertical raster scan order decision. Thus, adaptive decision will result in even higher bit-rate saving.

Figure 3:
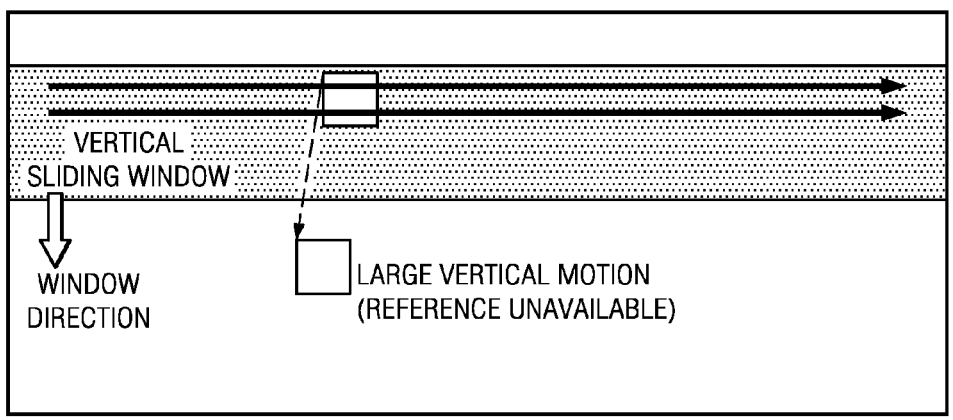
FIG. 3 is an embodiment of a vertical sliding window scheme for horizontal raster coding order.
Figure 4:
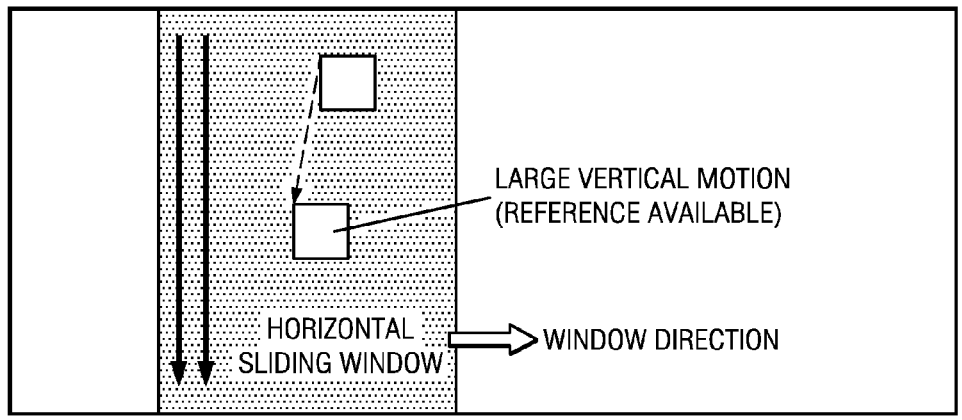
FIG. 4 is an embodiment of a horizontal sliding window scheme for vertical raster coding order.

FIG. 3 is an embodiment of a vertical sliding window scheme for horizontal raster coding order. If a video contains large vertical motion, the vertical sliding window scheme may not cover the large vertical motion. In this scenario, inter mode may not be used because required reference area is not available. This eventually causes encoding efficiency degradation. However, this problem could be solved by employing a horizontal sliding window scheme with vertical raster coding order, as illustrated in FIG. 4. FIG. 4 is an embodiment of a horizontal sliding window scheme for vertical raster coding order. Utilizing adaptively choosing raster scan order improves the coding efficiency of inter frames at the same on-chip memory requirement. On the other hand, the required on-chip memory size without coding gain loss is reduced.

For horizontal and vertical search range srX*srY, on-chip memory size (byte) for sliding window for 8-bit luma can be calculated as follows:

$$MemSizeHorOrder = picWidth * (2*srY+N),$$

$$MemSizeVertOrder = picHeight * (2*srX+N).$$

MemSizeHorOrder and MemSizeVertOrder are on-chip memory sizes for vertical sliding window (horizontal raster coding order) and horizontal sliding window (vertical raster coding order), respectively. N*N is the largest coding unit, and picWidth and picHeight are the horizontal and vertical size of the picture. Based on the equations, Table 1 lists the search ranges for different available on-chip memory sizes for 4 k×2 k (3840×2160) videos. For a given on-chip memory size, srY is always limited in vertical sliding window, which potentially causes encoding efficiency degradation for large vertical motion videos as illustrated in FIG. 3. By introducing vertical coding order with horizontal sliding window, we can remove the limitation on srY and avoid the degradation for large vertical motion videos.

TABLE 1

Available on-chip memory sizes vs. search ranges

| | 500 KBytes | | 750 Kbytes | | 1,000 KBytes | |
|---|---|---|---|---|---|---|
| | srX | srY | srX | srY | srX | srY |
| Vertical sliding window | un-limited | +/−33 | un-limited | +/−65 | Un-limited | +/−98 |
| Horizontal sliding window | +/−83 | un-limited | +/−141 | Un-limited | +/−199 | un-limited |

Figure 5:
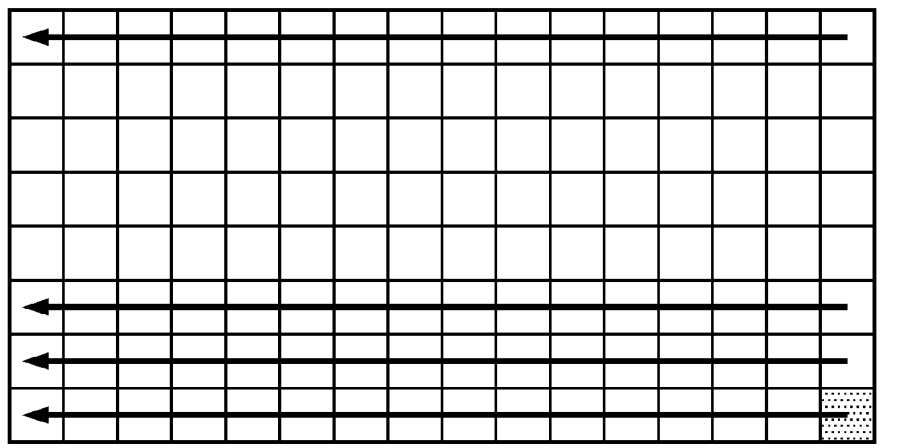
FIG. 5 is an embodiment depicting horizontal bottom-right to left.
Figure 6:
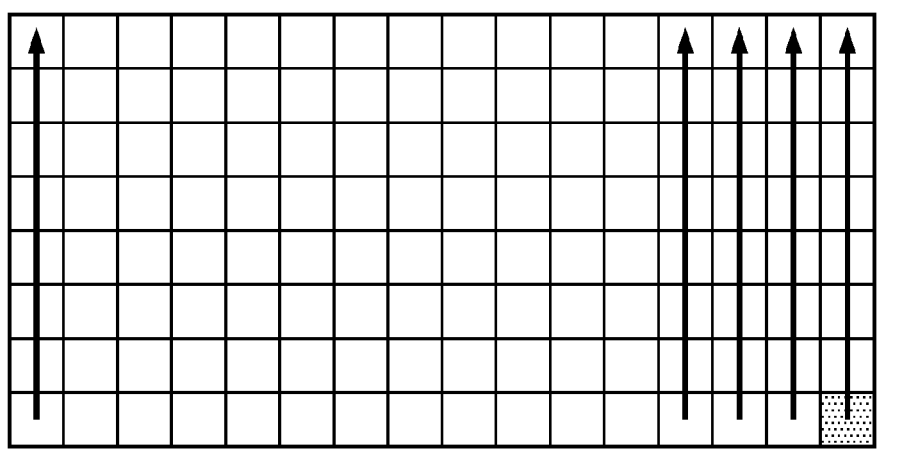
FIG. 6 is an embodiment of a vertical right-bottom to top.

The idea of vertical raster scan can be realized with frame rotation. Hence, similar effect may be seen by rotating input frames with horizontal raster scan. This information can be simply added as SEI (Supplemental Enhancement information) or VUI (Video Usability Information) in bitstreams. Moreover, we can extend this idea to any arbitrary raster scan order. We can apply one of 8 different raster can orders for each frames; horizontal top-left to right, as shown in FIG. 1, horizontal top-right to left, horizontal bottom-left to right, horizontal bottom-right to left, as shown in FIG. 5, vertical left-top to bottom FIG. 2, vertical left-bottom to bottom, vertical right-top to bottom and vertical right-bottom to top FIG. 6. It also can be realized by modifying input frames, i.e., e.g. rotating and/or flipping using SEI or VUI.

Figure 7:
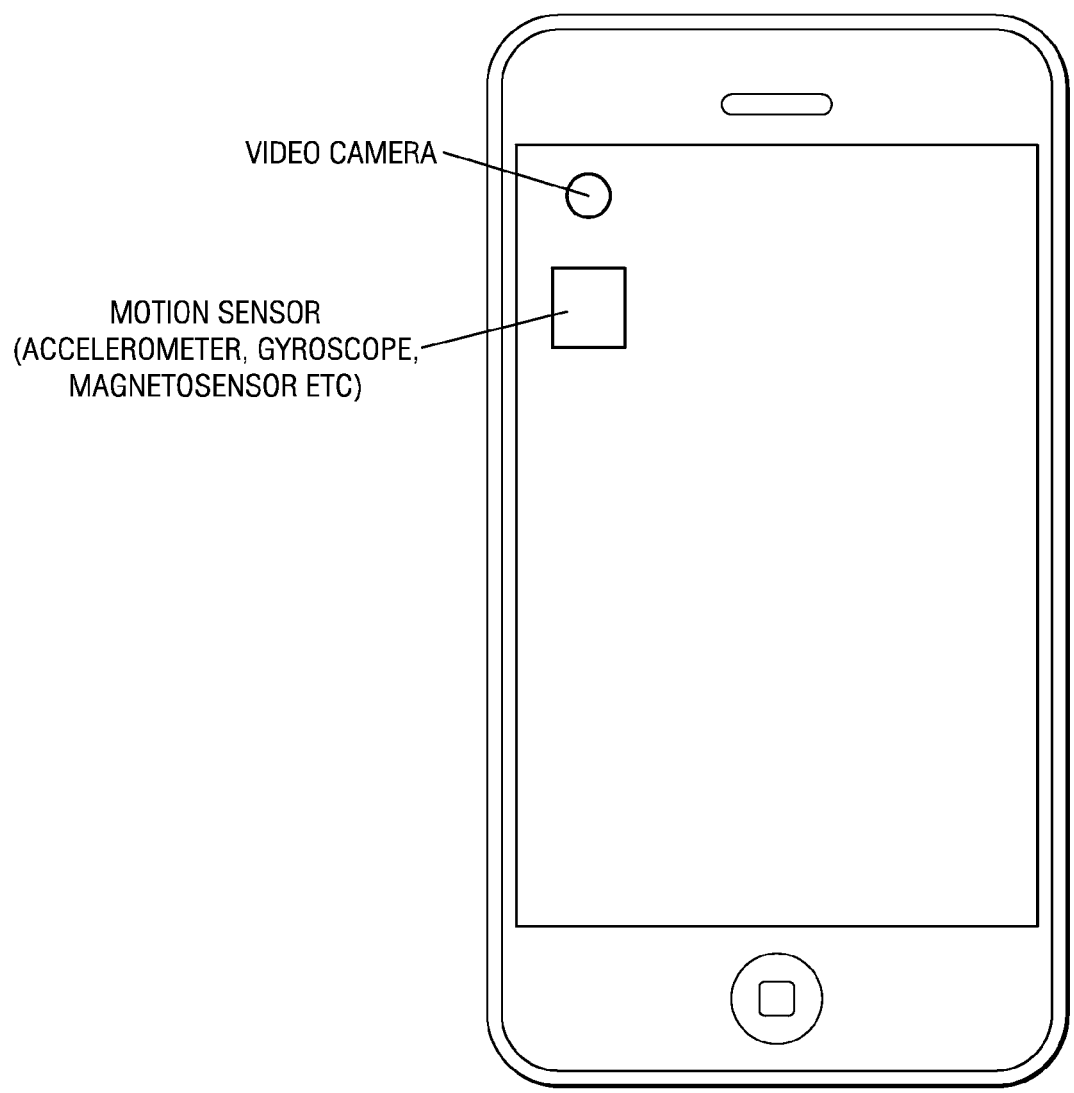
FIG. 7 is an embodiment of a portable device with video camera and motion sensor.

FIG. 7 is an embodiment of a portable device with video camera and motion sensor. The motion sensor consists one of the following sensors or a combination of them: accelerometer, gyroscope, magnetosensor etc. The motion sensor provided the camera orientation or displacement information. The displacement can be specified in terms of a rotation matrix, quarternion, euler angle etc.

Figure 8:
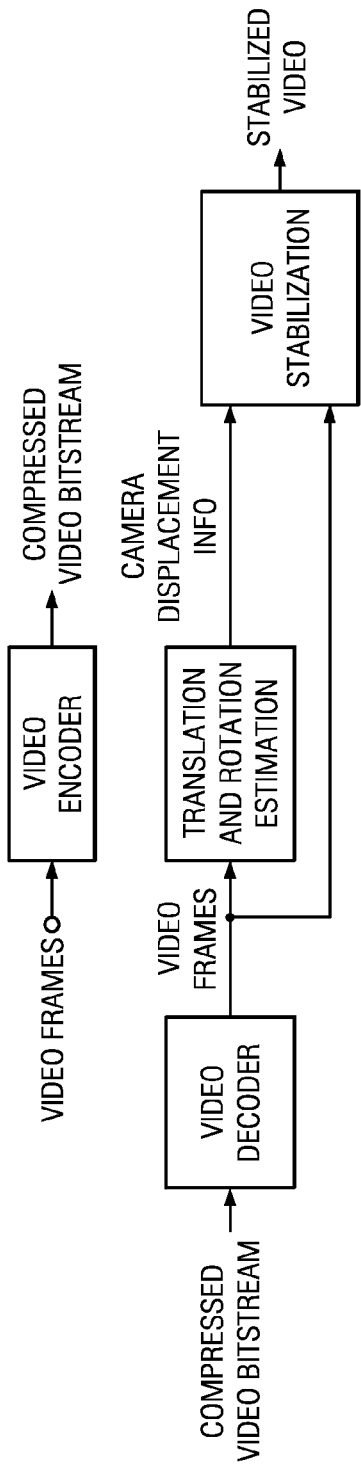
FIG. 8 is an embodiment of a video stabilizer in accordance with the prior art.
Figure 9:
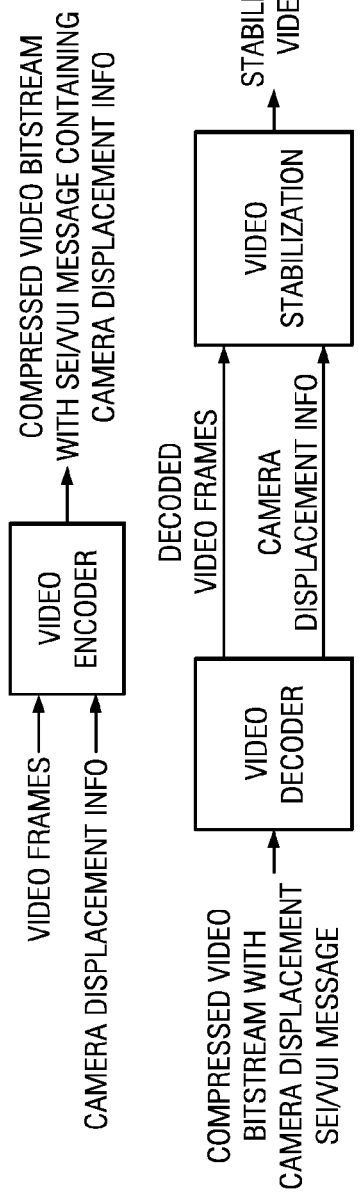
FIG. 9 is an embodiment of an improved video stabilizer.

FIG. 8 and FIG. 9 show a video stabilization where camera displacement information can be used. Video stabilization compensates for jitter in video due to changing camera position in order to provide a steady video. FIG. 8 is an embodiment of a video stabilizer in accordance with the prior art. In FIG. 8, the video stabilization is carried out in decoder. The camera displacement parameters are deduced from decoded frames and are used to translates/rotate/warp the decoded frame to generate stabilized video frames. Calculation of camera displacement parameters from decoded frames is very computationally intensive and prone to incorrect estimation.

On the other hand, FIG. 9 is an embodiment of an improved video stabilizer. The camera displacement information is calculated in the transmitter by using motion sensors. The displacement information is encapsulated in SEI/VUI and transmitted inside compressed bitstreams to receiver. The decoder at the receiver decodes the compressed bitstream with camera displacement SEI/VUI and generates decoded frames and displacement information which is then passed on to the video stabilization module which carries out video stabilization.

While the foregoing is directed to embodiments of the present invention, other and further embodiments of the invention may be devised without departing from the basic scope thereof, and the scope thereof is determined by the claims that follow.

What is claimed is:

1. A method of a digital processor for frame coding in adaptive raster scan order, comprising:
    encoding at least one of image or video utilizing input frames and at least one of a data related to the input frame and producing bitstream with adaptive scan order information and displacement information for producing compressed video bitstream.

2. The method of claim 1, wherein at least one of the data and the displacement information is embedded in at least one of a picture header, a Supplemental Enhancement Information (SEI) and a Video Usability Information (VUI) message.

3. An apparatus for frame coding, comprising:
    an encoder for encoding bitstream containing at least one of an adaptive scan order and displacement information for producing compressed video bitstream.

4. The apparatus of claim 3 further comprising a stabilizer for stabilizing the decoded frames with displacement information.

5. A non-transitory computer readable medium with computer readable instructions, when executed perform a method for frame coding in arbitrary raster scan order, comprising:
    encoding at least one of image or video utilizing input frames and at least one of a data related to the input frame and producing bitstream with adaptive scan order information and displacement information for producing compressed video bitstream.

6. The non-transitory computer readable medium of claim 5, wherein at least one of the data and the displacement information is embedded in at least one of a picture header, a Supplemental Enhancement Information (SEI) and a Video Usability Information (VUI) message.

* * * * *